Feb. 4, 1930.  C. C. FARMER  1,746,033
HOSE CLAMP
Filed Nov. 24, 1928

INVENTOR
CLYDE C FARMER
BY Wm. M. Cady
ATTORNEY

Patented Feb. 4, 1930

1,746,033

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOSE CLAMP

Application filed November 24, 1928. Serial No. 321,547.

This invention relates to hose clamps, and more particularly to a hose clamp for clamping the end of a flexible hose to a hose coupling or to a pipe section.

The principal object of my invention is to provide an improved hose clamp which is simple in construction and which may be cheaply manufactured.

Figure 1:
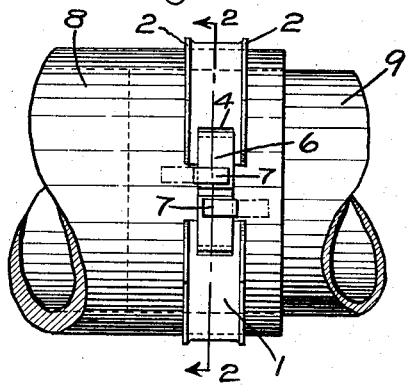
Figure 2:
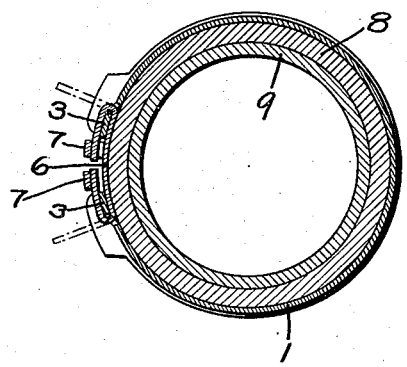
Figure 3:
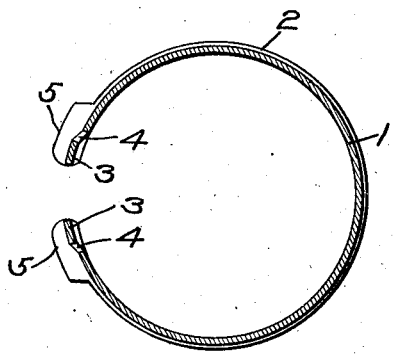
Figure 4:
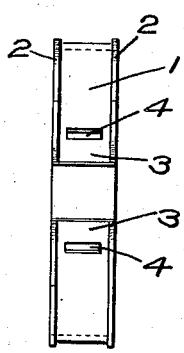

In the accompanying drawing; Fig. 1 is a view showing my improved hose clamp applied to clamp the end of a flexible hose to a pipe section; Fig. 2 is a section on the line 2—2 of Fig. 1; Fig. 3 a central sectional view of the hose clamp band; Fig. 4 a side view of the hose clamp band; and Fig. 5 a plan view of the clamping clip.

The hose clamp comprises a band 1 formed of sheet metal and bent to the contour of the flexible hose. The band may be provided with side flanges 2 serving to stiffen the band and the free ends 3 of the band are offset, as shown in Fig. 3. Rectangular openings 4 are provided in the band at the offsets and the side flanges 2 at the ends of the band may be extended to form lugs 5.

The clamping clip 6 is stamped out of sheet metal and is of such width that it may be readily inserted through the openings 4 of the band. The clip 6 is provided, near the central portion at opposite sides and in staggered relation, with lugs 7, as clearly shown in Fig. 5.

Figure 5:
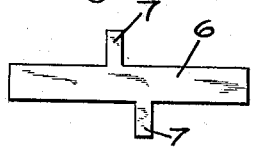

The clip 6 as shown in Fig. 5 is as stamped out. After being stamped, the opposite ends are bent up, as shown in dot and dash lines in Fig. 2, the bent up portions being spaced apart to correspond with the spacing of the openings 4.

With the flexible hose 8 applied to the end of a pipe section 9, the band 1 is positioned on the hose, as shown in Fig. 1, with the clip 6 inserted in the openings 4, the ends of the clip being positioned, as shown in dot and dash lines in Fig. 2. The ends of the band 1 are then pulled toward each other by the aid of a suitable tool adapted to engage the outer faces of the lugs 5, so as to tightly clamp the band 1 on the hose.

The ends of the clip 6 are then bent down to the position shown in full lines in Fig. 2, thus securely holding the band 1 in its clamping position.

The lugs 7 are now bent so as to be over the bent ends of the clip 6, as shown in Fig. 1, so as to lock the ends of the clip in place and prevent the clip ends from bending outwardly.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

A hose clamp comprising an annular band having spaced ends provided with openings and a clip having its ends threaded through said openings and bent over the end portions of said band, said clip being provided with two lugs, one of which is bent over and locks one bent over end of the clip, and the other of which is bent over and locks the other bent over end of the clip.

In testimony whereof I have hereunto set my hand, this 22nd day of November, 1928.

CLYDE C. FARMER.